United States Patent [19]
Doversberger

[11] 3,744,856
[45] July 10, 1973

[54] PRESSURE MODULATING BRAKE VALVE
[75] Inventor: Richard A. Doversberger, Peoria, Ill.
[73] Assignee: Westinghouse Air Brake Company, Peoria, Ill.
[22] Filed: Nov. 3, 1971
[21] Appl. No.: 195,144

[52] U.S. Cl. .............................. 303/54, 137/625.27
[51] Int. Cl. ............................................. B60t 15/12
[58] Field of Search .................. 303/52, 53, 54, 56, 303/10; 137/625.27

[56] References Cited
UNITED STATES PATENTS

| | | | |
|---|---|---|---|
| 1,445,380 | 2/1923 | Wright | 137/625.7 X |
| 2,404,122 | 7/1946 | Campbell | 303/54 |
| 2,698,205 | 12/1954 | Gagen | 303/54 |
| 2,752,947 | 7/1956 | Hruska | 303/54 X |
| 3,202,170 | 8/1965 | Holbrook | 137/625.27 X |
| 3,317,252 | 5/1967 | Gassman | 303/56 X |
| 3,469,890 | 9/1969 | Fulmer | 303/52 |
| 3,665,957 | 5/1972 | Fulmer et al. | 303/52 X |

*Primary Examiner*—Milton Buchler
*Assistant Examiner*—D. C. Butler
*Attorney*—Robert J. Eck

[57] ABSTRACT

A pressure modulating brake valve interposed between a fluid pressure accummulator and the brake line of a vehicle for selectively directing a volume of pressurized fluid to the vehicle brakes responsive to the application of the brake treadle, which urges a plunger to unseat a poppet valve located within the brake valve; the fluid pressure in the brake line also impinges against the plunger to offset the manual pressure exerted thereon and to permit the operator to feel the fluid pressure application. The brake valve also communicates the brake line with the vehicle main fluid reservoir, the plunger having a fluid bypass for permitting return flow when the fluid pressure in the brake line exceeds the manual pressure exerted on the brake treadle.

3 Claims, 5 Drawing Figures

INVENTOR
RICHARD A. DOVERSBERGER
BY Robert J. Eck
ATTORNEY

INVENTOR
RICHARD A. DOVERSBERGER
BY Robert J. Eck
ATTORNEY

PRESSURE MODULATING BRAKE VALVE

BACKGROUND AND SUMMARY OF THE INVENTION

The present invention relates in general to brake systems, and more particularly, to a pressure modulating valve therefor.

Present day brake systems employ either a master cylinder or an air chamber. Accordingly, the actuation capacity of such brake systems is undersirably limited as the pressure applied is directly proportional to the displacement of fluid in the master cylinder or the air chamber. In situations where the present day brake systems are improperly adjusted or develop a small leak, it is possible to have a potentially dangerous failure by having insufficient circuit fluid capacity. From a safety standpoint, therefore, if the main hydraulic system of the vehicle could be employed instead of the customary independent master cylinder or air chamber, the capacity of the brake system could be augmented with no limit as to the applied pressure.

By the present invention, the main hydraulic system of the vehicle is utilized for supplying a continuous volume of fluid to the brake line to effect the application of the brakes. The main reservoir of the vehicle is connected in circuit with a fluid pressure accummulator, which forces fluid under a predetermined pressure to the pressure modulating valve, being interposed between the fluid pressure accummulator and the brake line. The valve incorporates a poppet valve member which is normally biased into closed condition, thereby occluding fluid flow from the fluid pressure accummulator, but is urged into opened condition by the end wall of a plunger which is actuated by the application of the brake treadle. In this manner, the application of the vehicle brakes can be controlled and the applied pressure felt by the operator since the fluid pressure within the brake line is also exerted on the end wall of the plunger for developing a resistance to the mechanical force exerted thereon. Moreover, since there is a direct relationship between the brake line and the treadle applied plunger, no feeling of the brake actuation is lost since the brake system pressure responds in direct proportion to the manual pressure exerted on the brake treadle. The valve additionally provides minimum dead-band since the integral poppet valve serves the dual function of increasing the fluid line pressure at one end and reducing the fluid line pressure at the other end. The dead-band or sensitivity of the poppet valve can be controlled by merely increasing or decreasing the spacing between the end wall of the plunger and the adjacent end of the poppet valve member.

DESCRIPTION OF THE PREFERRED EMBODIMENT

Figure 1:
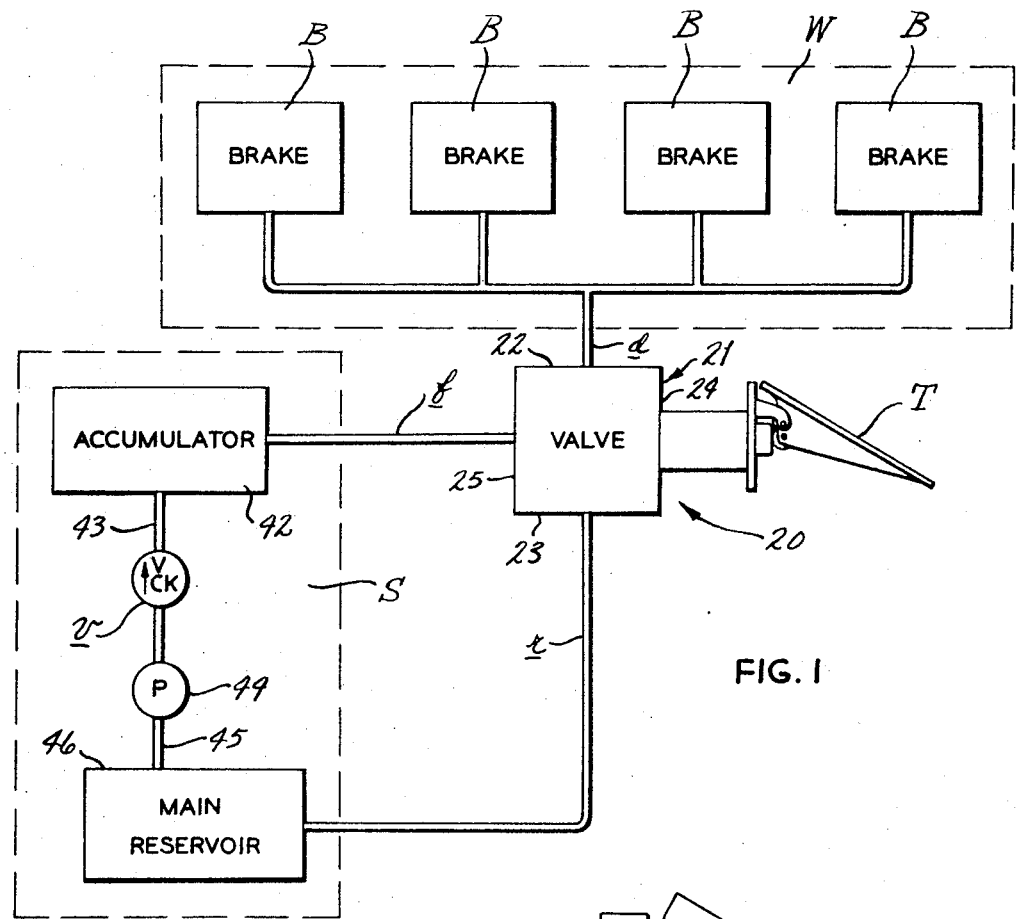
FIG. 1 is a schematic diagram of a vehicle brake system incorporating a pressure modulating valve constructed in accordance with and embodying the present invention.

Referring now by reference characters to the drawings wherein like reference characters designate like corresponding parts, there is shown in FIG. 1 a pressure modulating valve 20 connected to and controlled by a foot treadle T for selectively directing pressurized fluid from a source of fluid S through a feed line $f$ a discharge line $d$ to a work performing device W, such as the brakes B of a vehicle; there being a return line $r$ interconnecting the pressure modulating valve 20 to the source of fluid S so that the fluid within the discharge line $d$ may be returned to the source of fluid S.

Figure 5:
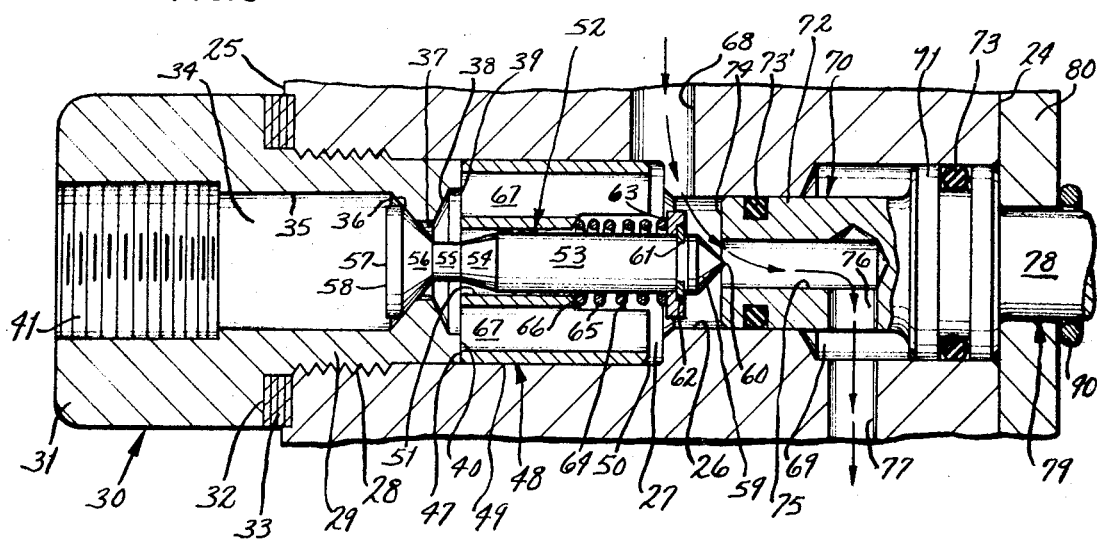
FIG. 5 is an enlarged view of a vertical section taken through the pressure modulating valve.

Said pressure modulating valve 20 comprises a body 21 having a top wall 22, a bottom wall 23, a front wall 24, and a rear wall 25. Provided transversely within valve body 21 is a bore 26 which opens through the front and rear walls 24,25. In the region adjacent rear wall 25, said bore 26 is counterbored for defining a compartment 27 which extends spacedly forwardly of rear wall 25. Said compartment 27 is provided with internal threads 28 for threadedly engaging the threaded shank 29 of a fitting 30 having a head 31 of larger cross section than threaded shank 29 for defining a shoulder 32 which abuts against the rear wall 25. If desired, a plurality of shims 33 (FIG. 5) may be interposed between the shoulder 32 of the head 31 and the rear wall 25.

Said fitting 30 is provided with an axial passage 34 comprising an inner wall 35 which radially narrows into an inwardly and forwardly tapered valve seat 36 which terminates into an orifice 37 being of less cross section than the inner wall 35; said orifice 37 merging into a radially outwardly and forwardly diverging wall 38 of a recess 39 opening into said compartment 27 through the end wall 40 of said threaded shank 29.

Said inner wall 35 is provided with an internally threaded portion 41 for accommodating one end of said feed line $f$ (FIG. 1), the other end of which is connected to a fluid pressure accumulator 42 of said source of fluid S; said fluid pressure accumulator 42 is of conventional construction, being filled in the usual fashion with a volume of hydraulic fluid under pressure. The fluid pressure accumulator 42 is in circuit by conduit 43 to the discharge side of a pump 44 the intake side of which is connected by a conduit 45 to a main fluid reservoir 46 for supplying an unlimited volume of fluid to the fluid pressure accumulator 42. A check valve $v$ may be interposed between the pump 44 and the fluid pressure accumulator 42 for prohibiting return flow to the main fluid reservoir 46.

Provided within the compartment 27 in abutting engagement with the fitting end wall 40 is the rear end wall 47 of a guide bushing 48 having a circumferential side wall 49, which engages the wall of compartment 27 and terminates into a forward end wall 50. Extending axially through the guide bushing 48 is a bore 51 which is in axial alignment with the axis of the passage 34 and the bore 26.

Reciprocally received within the bore 51 is a poppet valve 52 composed of a tubular body 53 being fashioned in its rearward end portion into a frusto-conical section 54 which tapers into a relatively small diametral neck 55, which in turn, blends into an outwardly and rearwardly diverging wall 56 of a frusco-conical shaped valve head 57 having an end wall 58 presented normal to the axis of the passage 34. The outwardly and rearwardly diverging wall 56 of the valve head 57 is adapted to engage the circumferential valve seat 36 for sealing the orifice 37 and the associated recess 39.

The forward end portion of said tubular body 53 is fabricated into a conical-shaped nose 59 which converges forwardly into a point 60 aligned with the axis of bore 26. Spacedly rearwardly of said conical-shaped nose 59, the tubular body 53 is formed with a peripheral groove 61 for accommodating a snap ring 62 having a diameter greater than that of the tubular body 53 and cooperating therewith to define a shoulder 63. The forward end wall 50 of the guide bushing 48 is provided with a counterbore 64 for receiving a spring 65 presented surroundingly of tubular body 53. One end portion of the spring 65 urges against the shoulder 63 of the snap ring 62 and the other end against a shoulder 66 defined by the junction of the counterbore 64 and the bore 51. It will be observed that the spring 65 normally urges the valve head 57 into seating engagement with the circumferential valve seat 36 for closing the orifice 37 so that fluid within the fluid pressure accumulator 42 may not pass therethrough. Moreover, the pressure of the fluid within the fluid pressure accumulator 42 impinges against the end wall 58 of the valve head 57 to enhance the seating engagement thereof and to resist rearward axial movement of the poppet valve 52.

Figure 4:
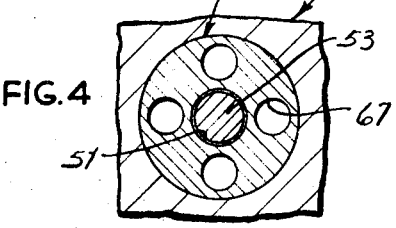
FIG. 4 is a fragmentary vertical section taken on the line 4 — 4 of FIG. 3.

Transversely within the guide bushing 48 there are provided a plurality of by-passes 67 (FIG. 4) which are located eccentrically thereof in circumferentially spaced-apart relationship; said by-passes 67 communicating the recess 39 with the bore 26. In the region immediately adjacent the forward end wall 50 of the guide bushing 48, said bore 26 is in communication through a discharge port 68 to said discharge line d for directing fluid flow to said work performing assembly W.

Coaxially of the bore 26 the front wall 24 is counterbored for establishing a compartment 69 which extends spacedly rearwardly of the front wall 24. Recieved within said compartment 69 is a piston 70 having a head 71 engaging the wall of the compartment 69 and a rod 72 extending rearwardly therefrom for projection into said bore 26. Both the rod 72 and the head 71 are formed with a peripheral groove for accommodating a seal 73,73' respectively, such as O-ring. Said rod 72, which is adapted for slideable movement within the bore 26, is provided with an end wall 74 facing said conical nose 59. Opening endwise through said end wall 74 is an axial passage 75 which is axially aligned with the point 60 of the conical-shaped nose 59 of the poppet valve 52. Said passage 75 opens into the compartment 69 through a by-pass 76 so that the fluid within said discharge port 68 may pass through the bore 26, passage 75, and by-pass 76 into the compartment 69. Formed within the bottom wall 23 of the valve body 21 is a return port 77 which is connected to said return line r for establishing communication between the compartment 69 and the main reservoir 46 of the source of fluid S.

The forward face of the piston head 71 is integrally formed with one end of the stem 78 of a plunger 79 which projects through an opening within a circular plate 80 presented in surfacewise engagement with the front wall 24 of valve body 21. The plunger 79 incorporates a pair of spaced-apart piston heads 81,81' which are adapted for reciprocal slideable movement on the stem 78 as will be described. The plunger 79 and its associated structure is housed within a cylindrical sleeve 82 having one end abutting against the front wall 24 being received over said circular plate 80, and the other end fixed within a pressure plate 83, which latter is connected to the front wall 24 by a plurality of drawbolts 84.

Spacedly forwardly of the piston head 71, the plunger stem 78 is provided with a groove for accommodating a snap ring 85 which is received within a complimentary recess 86 formed within the rearward face of the piston head 81. It will be observed that the piston head 81 divides the sleeve 82 into a return chamber 87, defined by the related walls of the piston head 81, sleeve 82 and circular plate 80, and a pressure chamber 88, defined by the walls of the piston head 81, piston head 81' and the sleeve 82; there being a passage 89 transversely within said piston head 81 for establishing communication between the return chamber 87 and the pressure chamber 88. Provided within the return chamber 87 surroundingly of stem 78 there is a return spring 90 having one end portion bearing against the circular plate 80 and the other end portion against a washer 91 which engages the snap ring 85 and the adjacent portion of the piston head 81.

Provided within pressure chamber 88 is a compression spring 92 having end portions received within annular grooves formed within the facing walls of piston heads 81 and 81'. Said compression spring 92 normally biases said piston heads 81,81' into spaced-apart relationship with the piston head 81 abutting against the snap ring 85 and the piston head 81' against an adjustment nut 93 which is threadedly engaged on the threaded terminal 94 of said stem 78. The adjustment nut 93 is employed to preset the compression spring 92 for applying a preload to the plunger 79. Received over said adjustment nut 93 is a compartment 95 formed within a pressure cup 96 having: an end wall 97 which engages the forward face of piston head 81'; a sidewall 98 which is received within an opening in a backing plate 99 being secured, as by bolts 100, to the pressure plate 83; and a forward end wall 101, which is adapted for engagement by the conventional cam roller 102 of a brake treadle T. The brake treadle T is pivotally mounted to the pressure plate 83 in a conventional manner for urging the pressure cup 96 and the plunger 79 axially within sleeve 82. The pressure cup 96 is enveloped by the usual rubber boot 103 which is secured to the backing plate 99 for assuring a protective dust proof condition.

Although only one pressure modulating valve A is shown and described in operative engagement with a brake treadle T, it will be understood that additional valves A may be employed to enhance the efficiency and safety of the brake system.

OPERATION

Figure 2:
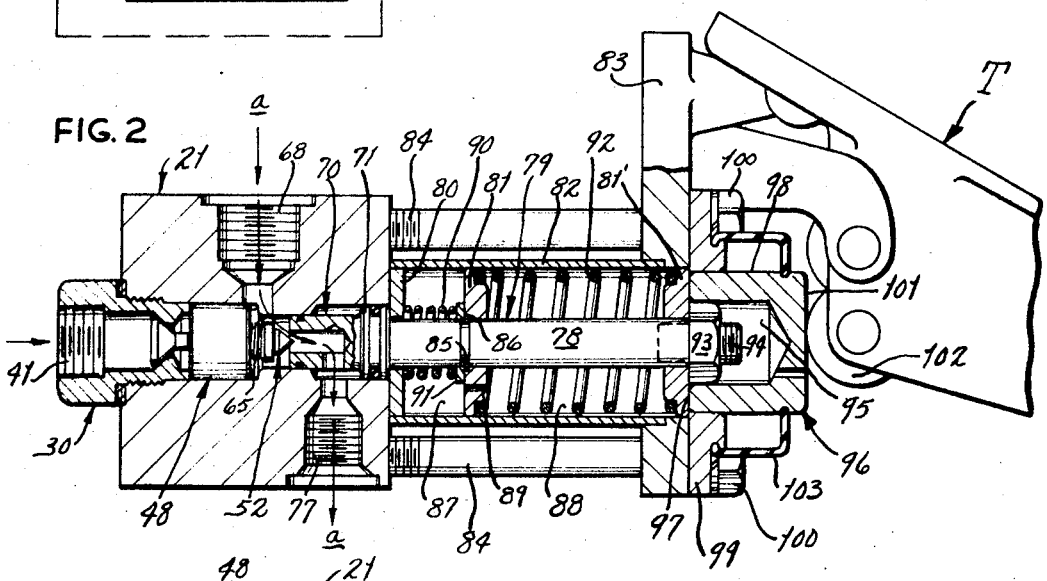
FIG. 2 is a vertical section taken through the pressure modulating valve illustrating same in valve-seated position.

In operation, the fluid pressure accumulator 42 is charged with a supply of hydraulic fluid under a predetermined pressure and is directed through feed line f into the passage 34 of fitting 30 for impingement against the valve head 57. With the poppet valve 52 in seated engagement with valve seat 36, (FIG. 2) it will be observed that the discharge port 68 and the return port 77 are in communication through the bore 26, passage 75 and by-pass 76 so that any fluid within the discharge line *d* will be returned to the main fluid reservoir 46 through return line *r*, as illustrated by line *a—a* in FIG. 2.

Figure 3:
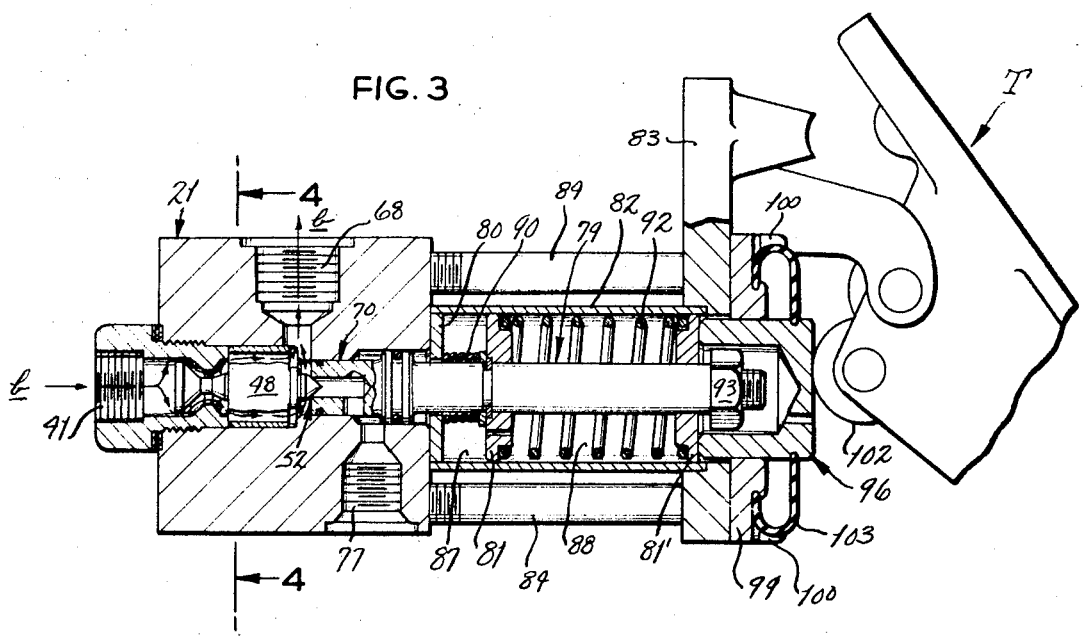
FIG. 3 is a vertical section taken through the pressure modulating valve illustrating same in valve-opened position.

Upon application of the foot treadle T, the pressure cup 96 and the piston head 81' will be urged axially within the sleeve 82, the compression spring 92 transmitting the force to the piston head 81 to urge the plunger stem 78 axially rearwardly against the bias of the return spring 90. The piston head 71 and the rod 72 will move rearwardly within compartment 69 until the conical nose 59 of the poppet valve 52 is received in sealing engagement within the passage 75. At this juncture, communication between the discharge port 68 and the return port 77 is closed. Upon continued axial movement of the piston rod 72, the tubular body 53 is urged rearwardly against the bias of its spring 65 and the pressure within the passage 34 of the fitting 30 for unseating the valve head 57. Fluid from the fluid pressure accumulator 42 will pass through the valve seat 36, orifice 37, recess 39 and the eccentric bypasses 67 of guide bushing 48 into the bore 26 and thence through discharge port 68 to the work performing assembly as illustrated by line *b—b* in FIG. 3. Fluid will continue to flow to the work performing assembly W until the pressure within the discharge line *d* is substantially the same as the manual pressure exerted on the plunger 79. When this occurs, the fluid pressure within the discharge line *d* and the bore 26 impinges against the end wall 74 of the piston rod 72 to urge same axially forwardly, thereby permitting the operator to feel the feedback of the fluid pressure. The poppet valve 52 will also move axially forwardly, through the bias of the spring 65 and the fluid pressure within the passage 34, to establish sealing engagement of the valve head 57 with the valve seat 36. At this juncture, the plunger 79 and the poppet valve 52 will be in a state of equilibrium. Therefore, as long as the operator maintains a steady pressure on the foot treadle T, the vehicle brake B will be applied with a continuous, equal force. The braking force may be increased or decreased through a proportionate depression or release of the foot treadle T. Thus, if the braking force is insufficient, the operator may apply additional pressure to the foot treadle T for urging the poppet valve 52 further rearwardly to enlarge the space between the valve head 57 and the valve seat 36 thereby increasing the fluid pressure within the discharge line *d*. Conversely, if the braking force is too great, the operator may release the foot treadle T for moving the piston rod 72 axially forwardly with the consequent movement of the poppet valve 52, through the bias of the spring 65 and the pressure within the passage 34, axially forwardly to reduce the spacing between the valve head 57 and the valve seat 36 thereby decreasing the fluid flow to the discharge line *d*. Since the fluid pressure in the discharge line *d* will be greater than the manual pressure exerted on the plunger 79 when the foot treadle T is released, the pressure within the bore 26 will impinge against the end wall 74 of the piston rod 72 to urge same forwardly thereby releasing the conical nose 59 from within the passage 75 so that fluid may pass through passage 75 and bypass 76 for return flow to the main fluid reservoir 46 through the return port 77 and the return line *r*. The passage 75 will remain opened until the pressure within the discharge line *d* and the bore 26 is substantially the same as the manual pressure exerted on the foot treadle T. At this juncture, the conical nose 59 will be received in sealing engagement with the passage 75 and the poppet valve 52 and the plunger 79 will be in equilibrium.

Upon disengagement of the foot treadle T, the return spring 90 will urge the plunger 79 to its initial position and the fluid within the discharge line *d* will return to the main fluid reservoir 46, as above described.

Thus, the operator may readily control the fluid pressure directed to the work performing assembly W by selective manipulation of the foot treadle T, the operator being able to "feel" the fluid pressure within the discharge line *d* at all times. Accordingly, it will be observed that the plunger 79 and the poppet valve 52 are balanced in equilibrium so that whenever the equilibrium is changed, as by depression or release of the brake treadle T, the plunger 79 and the poppet valve 52 will coact to restore the equilibrium condition.

1. A pressure modulating valve assembly comprising:
A valve body having an inlet port and outlet port;
Said inlet port being adapted for fluid flow connection to a source of fluid pressure;
Said outlet port being adapted for fluid flow connection to a fluid responsive work performing element;
Passage means connecting said inlet port and said outlet port;
A guide bushing received within said passage means and positioned between said inlet port and said outlet port, said guide bushing having a bore;
A valve seat circumscribing said inlet port;
A valve member slideably received within the bore of said guide bushing for movement into and out of engagement with said valve seat;
Said guide bushing having a counterbore adjacent to the outlet port;
Resilient means received within said counterbore;
Means defining a shoulder on said valve member against which said resilient means abuts for normally urging said valve member into seated engagement with said valve seat;
Fluid bypass means extending through said guide bushing for communicating said inlet port with said outlet port;
Actuating means within said passage means engageable with said valve member for urging same out of engagement with said valve seat, said actuating means having a free end portion projecting outwardly of said valve body adapted for subjection to an external force.

2. A pressure modulating valve assembly comprising:
A valve body having an inlet port and an outlet port;
Said inlet port being adapted for fluid flow connection to a source of fluid pressure;
Said outlet port being adapted for fluid flow connection to a fluid responsive work performing element;
Passage means including a compartment connecting said inlet port and said outlet port;
A guide bushing received within said compartment and having an axial bore therethrough;
A valve member slidably received within said guide bushing bore;
A fitting member received within said compartment in endwise abutting relationship to said guide bushing;
Said fitting member having an axial passage defined by an inner wall;

Said inner wall having a first radially varying portion tapering radially decreasingly toward said compartment for developing a valve seat;

Said inner wall further having a second radially varying portion diverging radially increasingly toward said compartment and opening into said compartment;

Orifice means connecting said first and second radially varying portions;

Said valve member having a head portion engageable with said valve seat;

Resilient means normally urging said valve member into seated engagement with said valve seat;

Fluid bypass means extending through said guide bushing for communicating said inlet port with said outlet port;

Actuator means within said passage means engageable with said valve member for urging same out of engagement with said valve seat, said actuating means having a free end portion projecting outwardly of said valve body adapted for subjection to an external force.

3. A pressure modulating valve assembly as defined in claim 2 and further characterized by:

Said valve member comprising a tubular body;

Said head portion comprising a first frusto-conical portion having a radially diverging wall for snug reception within said valve seat;

A second frusto-conical portion normally received within said guide bushing bore; and A relatively small diametral neck connecting said first and second frusto-conical portions.

* * * * *